United States Patent [19]
Koenig

[11] Patent Number: 5,196,207
[45] Date of Patent: Mar. 23, 1993

[54] MELTBLOWN DIE HEAD

[75] Inventor: Robert J. Koenig, Roswell, Ga.

[73] Assignee: Kimberly-Clark Corporation, Neenah, Wis.

[21] Appl. No.: 826,332

[22] Filed: Jan. 27, 1992

[51] Int. Cl.⁵ .............................................. B29C 47/12
[52] U.S. Cl. ................................ 425/72.2; 264/211.14; 425/378.2; 425/464
[58] Field of Search .................. 425/7, 72.2, 66, 80.1, 425/83.1, 378.2, 382.2, 461, 463, 464; 264/12, 176.1, 210.8, 211.14, 211.17

[56] References Cited

U.S. PATENT DOCUMENTS

| | | | |
|---|---|---|---|
| 3,379,811 | 4/1968 | Hartmann et al. | 264/555 |
| 3,676,242 | 7/1972 | Prentice | 156/62.4 |
| 3,825,379 | 7/1974 | Lohkamp et al. | 425/72.2 |
| 3,849,241 | 11/1974 | Butin et al. | 428/137 |
| 3,888,610 | 6/1975 | Brackmann et al. | 425/72.2 |
| 3,954,361 | 5/1976 | Page | 425/72.2 |
| 3,970,417 | 7/1976 | Page | 425/72.2 |
| 3,981,650 | 9/1976 | Page | 425/72.2 |
| 3,985,481 | 10/1976 | Brackmann et al. | 425/72.2 |
| 4,043,739 | 8/1977 | Appel | 425/461 |
| 4,073,850 | 2/1978 | Brackmann et al. | 264/555 |
| 4,135,903 | 1/1979 | Ohsato et al. | 65/5 |
| 4,185,981 | 1/1980 | Ohsato et al. | 65/5 |
| 4,243,400 | 1/1981 | Ohsato et al. | 65/8 |
| 4,295,809 | 10/1981 | Mikami et al. | 425/72.2 |
| 4,380,570 | 4/1983 | Schwarz | 428/296 |
| 4,472,329 | 9/1984 | Muschelknautz | 264/12 |
| 4,486,161 | 12/1984 | Middleton | 425/7 |
| 4,622,259 | 11/1986 | McAmish et al. | 428/171 |
| 4,720,252 | 1/1988 | Appel et al. | 425/80.1 |
| 4,797,083 | 1/1989 | Reifenhauser | 425/378.1 |
| 4,818,464 | 4/1989 | Lau | 264/510 |
| 4,826,415 | 5/1989 | Mende | 425/72.2 |
| 4,889,476 | 12/1989 | Buehning | 425/72.2 |
| 4,904,174 | 2/1990 | Moosmayer et al. | 425/174.8 E |
| 4,963,298 | 10/1990 | Allen et al. | 264/12 |

OTHER PUBLICATIONS

Naval Research Report No. 4364, "Manufacture of Super-Fine Organic Fibers" by V. A. Wendt, E. L. Boon and C. D. Fluharty, May 25, 1954.

Naval Research Report No. 5265, "An Improved Device for the Formation of Super-Fine Thermoplastic Fibers" by K. D. Lawrence R. T. Lukas and J. A. Young, Feb. 11, 1959.

Primary Examiner—Jay H. Woo
Assistant Examiner—James P. Mackey
Attorney, Agent, or Firm—William D. Herrick

[57] ABSTRACT

There is disclosed a meltblown die head having a heated gas reservoir extending the length of the die head. The heated gas used in the meltblowing process is introduced into the reservoir and serves as a heat source for maintaining the temperature of the polymer and maintaining a uniform temperature of the die assembly during the meltblowing process.

8 Claims, 2 Drawing Sheets

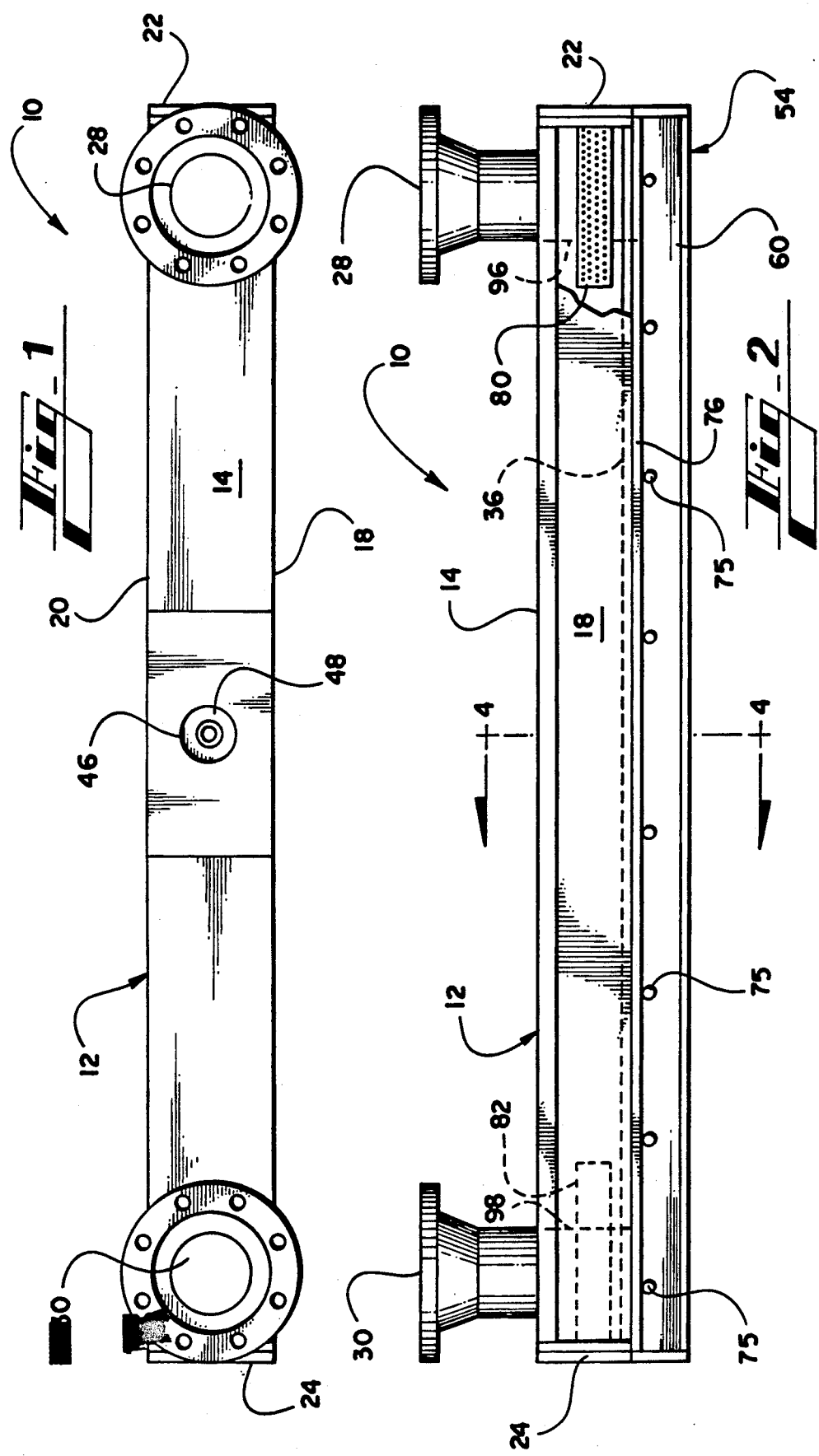

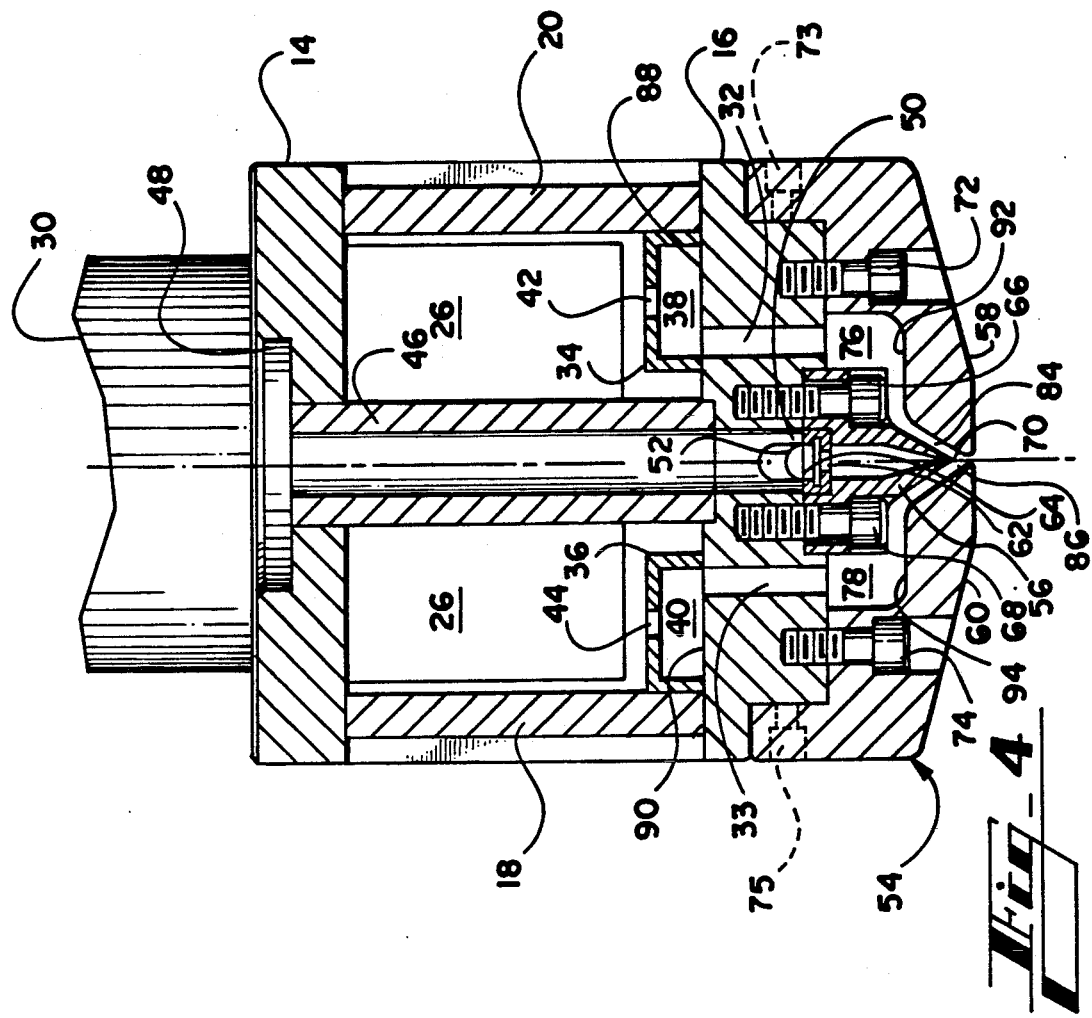
Fig_4
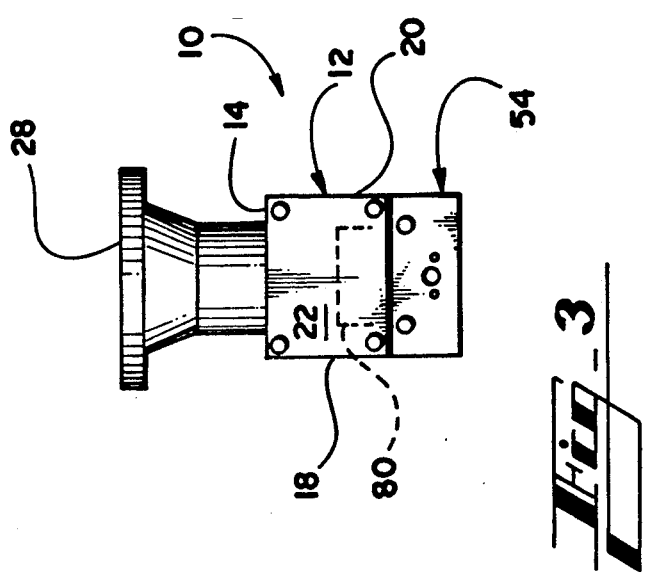
Fig_3

MELTBLOWN DIE HEAD

BACKGROUND OF THE INVENTION

This invention relates generally to die heads for producing meltblown fibers from a thermoplastic polymer and nonwoven webs from such meltblown fibers, and more particularly concerns a meltblown die head in which the die head includes a gas reservoir extending the length and width of the die head and containing a volume of the heated gas which is used for the meltblowing process, for maintaining the temperature of the thermoplastic polymer, and for maintaing a constant temperature along the length of the die head.

Forming nonwoven webs of thermoplastic fibers by meltblowing is well known in the art and described in various patents and publications, including *Naval Research Laboratory Report No. 4364*, "Manufacture of Super-fine Organic Fibers" by V. A. Wendt, E. L. Boon, and C. D. Fluharty; *Naval Research Laboratory Report No. 5265*, "An Improved Device for the Formation of Super-fine Thermoplastic Fibers" by K. D. Lawrence, R. T. Lukas, and J. A. Young; U.S. Pat. Nos. 3,849,241 to Buntin, et al.; 3,676,242 issued to Prentice; and 3,981,650 to Page.

In general, meltblowing employs an extruder to force a hot melt of thermoplastic material through a row of fine orifices in a die tip of a die head into converging high velocity streams of heated gas, usually air, arranged on each side of the extrusion orifice. A conventional die head is disclosed in U.S. Pat. No. 3,825,380 to Harding et al.

As the hot melt exits the orifices, it encounters the high velocity heated gas stream, and the stream of thermoplastic material is attenuated by the gas and broken into discrete fibers which are then deposited on a moving collector surface, usually a foraminous belt, to form a web of thermoplastic material.

In accordance with conventional practice, the die head is provided with heaters adjacent the die tip in order to maintain the temperature of the polymer as it is introduced into the orifice of the dip tip through feed channels. For example, McAmish et al. U.S. Pat. No. 4,622,259 discloses a conventional die head in which the hot melt is forced from the extruder into a heater chamber located between the die plates that form the die tip. The hot melt is heated in the die tip by means of auxiliary heating elements embedded in the die tip itself. Such a heating method requires heating elements along the entire length of the die head assembly and sophisticated sensors to insure a constant temperature for the polymer from one end of the die head to the other. In addition, when auxiliary heating elements are employed it is necessary for the die assembly to have a high thermal mass to insure even distribution and maintenance of temperature along the length of the die head. If the temperature is allowed to fluctuate across the length of the die head, the meltblown fibers produced at one position on the die head may have different characteristics than those produced at another position on the die head resulting in a nonwoven meltblown web that is inconsistent in its composition from one edge to the other across its width. A failure of any heating element along the length of the die head will result in unacceptable fiber production adjacent the failed heating element and will require time consuming replacement of the heating element.

Page U.S. Pat. No. 3,970,417 discloses a conventional die head in which a channel for supplying the hot melt to the die tips is machined from the mating halves of the die tip to form a polymer feed channel in the shape of a coat hanger. In order to insure even distribution of the hot melt in such a coat hanger feed channel, electric heaters are provided in the die tip adjacent the feed channel to provide a uniform temperature along the length of the feed channel. Particularly, layers of insulation are provided between the heaters and the outside wall of the die tip which is adjacent to small plenum chambers through which the meltblowing air is supplied. Such insulation is specifically provided to prevent changes in the air temperature from affecting the temperature of the die tip and therefore the hot melt within the coat hanger feed channel.

Likewise, Lohkamp et al. U.S. Pat. No. 3,825,379 shows heaters adjacent the die tip for maintaining the temperature of the hot melt prior to extrusion through the die orifice.

In Buehning U.S. Pat. No. 4,889,476, there is disclosed a die tip having increased die tip thickness to provide a large thermal mass for the die tip to insure maintenance of the desired temperature for the hot melt. The temperature of the massive die tip is maintained by electric cartridge heaters in the die tip. More particularly, the die head is designed so that the attenuating air stream is thermally isolated from the body of the die. Consequently, the attenuating air stream does not affect the creation of and maintenance of the proper temperature of the hot melt during the extrusion of the hot melt.

In summary, conventional meltblown die heads have depended on electric heaters and thermal mass to insure thermal stability. Moreover, in conventional die heads the die tips are isolated from the meltblowing air so the meltblowing air will not affect the temperature of the hot melt in the die tip of the die head.

SUMMARY OF THE INVENTION

By contrast, it is an object of the present invention to provide a die head in which the heated air used in the meltblowing process is utilized to maintain the temperature of the hot melt during the extrusion of the hot melt through the orifice of the die tip.

It is likewise an object of the present invention to provide a die head which is less massive than conventional die heads.

It is also the object of the present invention to provide a die head which is simplified in its construction.

It is likewise an object of the present invention to provide a die head which, because of its reduced mass can be more quickly brought to operating temperature upon start up of the meltblowing process.

It is also an object of the present invention to insure uniform heating of the die assembly to insure uniform production of meltblown fibers along the length of the die head.

The foregoing objects of the present invention are accomplished by a meltblown die head comprising an elongated support member in the form of a box beam with sides and ends which define a heated gas reservoir. A polymer feed tube extends through the gas reservoir from top to bottom and terminates in a longitudinal extending polymer feed groove along the bottom side of the box beam for delivery of the hot melt to a detachable meltblown die assembly attached to the bottom side of the box beam. The die tip of the die assembly is in communication with the feed groove for receiving the hot melt from the feed tube, and the air plates on either side of the die tip form gas delivery channels which channels receive the heated gas from the gas reservoir.

With the heated gas reservoir extending the full length of the die head and being in intimate contact with the detachable die assembly, all parts of the die assembly are brought to and maintained at the appropriate operating temperature by means of the heated gas in the gas reservoir. The constant delivery of heated gas to the reservoir and exhaustion of the heated gas from the reservoir through the gas delivery channels assure a constant and even temperature for the entire die head including the die assembly thereby assuring uniform temperature at all points where the hot melt is extruded from the die tips.

Other objects and advantages of the invention will become apparent upon reading the following detailed description and upon reference to the drawings.

BRIEF DESCRIPTION OF THE DRAWINGS

FIG. 1 is a top plan view of a meltblown die head in accordance with the present invention;

FIG. 2 is a front elevation view of the meltblown die head in accordance with the present invention;

FIG. 3 is an end elevation view of the meltblown die head in accordance with the present invention; and FIG. 4 is a section view of the meltblown die head of the present invention as seen along line 4—4 of FIG. 2.

DETAILED DESCRIPTION OF THE INVENTION

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Turning to FIGS. 1-3 there is shown a meltblown die head 10 constructed in accordance with the present invention. The die head 10 comprises an elongated support member 12 in the form of a box beam. The box beam 12 comprises top 14, bottom 16, front side 18, back side 20, right end 22, and left end 24. The enclosed box beam 12 with its top, bottom, sides and ends, forms a heated gas reservoir 26 (FIG. 4). Gas inlets 28 and 30 are located at either end of box beam 12. The gas inlets 28 and 30 connect a source of heated pressurized gas (not shown) to the reservoir 26 inside the box beam 12. A pair of U-shaped, perforated baffles 80 and 82 are located adjacent gas inlets 28 and 30 to breakup the gas flow and thereby reduce eddy currents and turbulence in the reservoir 26.

The box beam 12 also has expansion chambers 38 and 40 formed by internal walls 34 and 36 which expansion chambers are positioned inside the box beam 12 adjacent each of the sides 18 and 20 and the bottom 16. The expansion chambers 38 and 40 extend the length of the box beam 12. A series of expansion chamber holes 42 and 44 are drilled in internal walls 34 and 36 respectively to provide communication between the gas reservoir 26 and expansion chambers 38 and 40. A second series of gas outlet holes 32 and 33 are located on both sides of bottom 16 and extend along the length of the box beam 12. The gas outlet holes 32 and 33 communicate between the expansion chambers 38 and 40 and gas delivery chambers 76 and 78 respectively of die assembly 54. It should be noted that the expansion chamber holes 42 and 44 are in alignment with flat surfaces 88 and 90 respectively of expansion chambers 38 and 40. Likewise the gas outlet holes 32 and 33 are in alignment with flat surfaces 92 and 94 respectively of gas delivery chambers 76 and 78.

A polymer feed tube 46 extends through the top 14 of the box beam 12, through the reservoir 26 and through the bottom 16 of the box beam 12. The polymer feed tube 46 is connected to the output of a polymer extruder (not shown) at its input end 48. The output end 50 of the polymer feed tube 46 terminates in a tapered polymer feed groove 52 which runs the length of the box beam 12. The tapered polymer feed groove 52 is located within the confines of the bottom 16 of the box beam 12, and its cross-sectional area decreases from the feed tube to each end.

The die assembly 54 is detachably mounted to the bottom 16 of the box beam 12. The die assembly 54 comprises die tip 56 and gas plates 58 and 60. The die tip 56 includes a breaker plate 62 which supports screen 64. The die tip 56 is connected to the bottom 16 of the box beam 12 by means of a series of bolts 66 and 68. Once the die tip is attached to the bottom 16 of the beam box 12, the tapered polymer feed groove 52 communicates with the screen 64, the breaker plate 62, and then orifice 70 of the die tip 56. The screen 64 filters the hot melt to remove agglomerated masses before they can reach and clog the orifice 70.

Gas plates 58 and 60 are likewise connected to the bottom 16 of the box beam 12 by means of a series of bolts 72, 73, 74 and 75. When in place, the gas plates 58 and 60 in conjunction with die tip 56 form gas delivery chambers 76 and 78. Tapered gas delivery channels 84 and 86 extend from gas delivery chamber 76 and 78. The gas delivery channels 84 and 86 converge adjacent orifice 70 of the die tip 56.

Consequently, the heated gas in reservoir 26 flows from reservoir 26 through expansion chamber holes 42 and 44, through expansion chambers 38 and 40, through output holes 32 and 33, through gas delivery chambers 76 and 78 and then to delivery channels 84 and 86 adjacent the orifice 70 to attenuate the polymer as it exits the orifice 70.

In operation, the heated air of about 550° F. is fed into the gas inlets 28 and 30 at each end of the box beam 12. As the heated air enters the reservoir 26, it encounters the perforated baffles 80 and 82. The baffles break up the air flow and direct the air to produce an initial cross velocity (a component of flow along the length of the reservoir) at cross-sections 96 and 98 (FIG. 2) where the inlets intersect the reservoir 26. The initial cross velocity is limited to 100–150 feet/sec by the size of the inlets 28 and 30 and the volume of air introduced onto the reservoir 26. By limiting the initial cross velocity to 100–150 feet/sec, the initial cross velocity head will not exceed 0.15 psi. The low initial cross velocity head of about 0.15 psi insures that by the time the air reaches gas delivery chambers 76 and 78, the heated air will have virtually no component of velocity along the length of the die head. Such air management assures minimum turbulence as the air moves from gas delivery chambers 76 and 78 into delivery channels 84 and 86.

In addition to the cross velocity of the air in reservoir 26, the air flow in the vertical direction (the flow direction) must also be managed properly to minimize turbulence. As the heated gas flows from the gas inlets 28 and 30 to orifice 70, the gas is first compressed and then expands as it successively enters the reservoir 26, the expansion chambers 38 and 40, and the gas delivery chambers 76 and 78. The openings and the chambers are sized so that the flow direction velocity (vertical flow direction) increases at each stage. Particularly, the flow direction velocity into the reservoir 26 is 10–20 feet/sec, the flow direction velocity into the expansion chambers 38 and 40 is 19–40 feet/sec, and the flow direction velocity into the gas delivery chambers 76 and 78 is 80–190 feet/sec. At each stage, there is a pressure drop. Prior die heads have typically exhibited pressure drop from air source (the inlet) to die tip of 5–7 psi. The die head of the present invention exhibits a pressure drop from reservoir 26 to the die tip of 0.5–1.5 psi. The lower pressure drop results in reduced power required for the compressor for the heated air.

The spacing and location of the expansion chamber holes 42 and 44 and of the gas outlet holes 32 and 33 are of importance to the heat transfer characteristics of the die head. As previously noted, the expansion chamber holes 42 and 44 and the gas outlet holes 32 and 33 are located so that they are in alignment with flat surfaces 88, 90, 92 and 94. As the heated air accelerates through the holes 32, 33, 42, and 44, a heated gas jet is created which washes and spreads radially over the aligned flat surface to produce maximum convective heat transfer. The spacing of the holes is thereby set to assure that the circular patterns of the air jets on the flat surfaces intersect to provide complete coverage by the heated air of the flat surfaces. The hole size and jet velocity generally result in a hole pattern of 1.0–2.5 holes/inch of die length. The jet action of the holes 32, 33, 42, and 44 result in heat transfer to the die assembly that is as much as five times the heat transferred to the side and top walls of the beam box 12.

Moreover, in accordance with the present invention, the outer surfaces of the entire die head including the die assembly are insulated to minimize heat loss to the surroundings. The insulation is typically a composite formed from fiber glass encased in a fabric and a metal skin. The composite forms a split shell about the die head so that it can be removed as necessary. The composite is about two inches thick on the top, sides, and ends of the die head. On the bottom of the die head, adjacent the die tip, the composite tapers from a thickness of about one inch to a lesser thickness adjacent the die tip. The insulation is design to insure that the outside of the insulation does not exceed a temperature of about 100° F. although near the die tip where the insulation is thinner that temperature is likely exceeded.

The reservoir 26 is sized and configured to provide sufficient thermal capacity to rapidly heat and maintain the temperature of the die assembly 54. The air flow and heat transfer of the die head can, if desired, be conveniently determined by computer simulation. A number of computer simulation programs exist including "Fluent" sold by Fluent, Inc. Consequently, the sizing of the reservoir 26 is a matter of design choice for a person of ordinary skill in the art given the mass of the die assembly, and the parameter for the heated gas required for meltblowing a particular polymer at a particular throughput.

Because the die assembly 54 is heated by a large volume of heated air in the reservoir 26, the die tip assembly 54 is rapidly heated to its operating temperature, and the temperature of the die tip remains uniform across the width of the meltblown die head 10. Particularly, temperature sensors were placed on each of the bolts 75 (FIG. 2) at a spacing of approximately 7.5 inches on a 60 inch long die head. Once the die head reached a steady state temperature, the temperature readings were recorded along the die head (from left to right in FIG. 2):

522° F.
526° F.
510° F.
497° F.
496° F.
512° F.
519° F.
515° F.

The maximum difference of 30° F. between the eight positions is small compared to variations of approximately 100° F. over the length of a conventional die head. Consequently, there is nearly a three to one improvement in temperature uniformity across the length of the die head of the present invention as compared to conventionally heated die heads using auxiliary electric heaters. Moreover, subsequent operation of the die head suggests that long term steady state temperatures may, in fact, be more uniform than the initial measurements set out above indicate.

The uniform temperature along the die head's length also produces a uniform meltblown web. In order to test the performance of the 60 inch die head of the present invention, a meltblown nonwoven web was prepared. The polymer was polypropylene, Himont HH445 supplied by Himont USA of Wilmington, Del. The polymer was feed to the die head at a throughput of 3–4 pounds per inch of die length per hour (PIH). The hot melt was fed at a temperature of 525° F. The temperature of the attenuation air was 550° F. The forming distance was 12 inches, and the under wire vacuum was 4 inches of water.

Once the nonwoven web was prepared in accordance with the parameters set forth above, seven evenly spaced samples of 5 inches wide (in the cross machine direction) and 10 inches long (in the machine direction) were cut from the nonwoven web. The coefficient of variation was then calculated for the seven samples by taking the average basis weight of each sample, subtracting the basis weight of each individual sample from the average basis weight and dividing the difference by the average basis weight. The result was then multiplied by 100 percent to produce the coefficient of variation. The coefficient of variation for the nonwoven web made using the 60 inch meltblown die head of the present invention was 3.9 percent. Conventional nonwoven webs formed in accordance with the parameters set forth above and made using a conventional meltblown die head had coefficients of variation of between 8 and 12 percent. Consequently, the meltblown die head of the present invention provides a three-fold increase in uniformity of the resulting meltblown web.

I claim:
1. A meltblown die head comprising:
   a. an elongated support member comprising:
      i. a box beam with sides and ends defining a gas reservoir, wherein
         (a) the gas reservoir has at least one gas inlet for introducing heated gas into the gas reservoir, and
         (b) the gas reservoir has gas outlets for exhausting gas from the gas reservoir; and ii. a polymer feed tube extending through the gas reservoir and terminating in a longitudinally extending feed groove along one side of the box beam; and b. a detachable meltblown die assembly attached to the side of the box beam having the feed groove and comprising:
i. a die tip in communication with the feed groove for receiving polymer from the feed tube; and
ii. gas plates on either side of the die tip forming gas delivery channels, said channels being in communication with the gas outlets of the gas reservoir; and c. at least one internal expansion chamber in the box beam in communication with the gas reservoir by a first series of holes and in communication with the meltblown die assembly via the gas outlets which comprise a second series of holes.

2. The meltblown die head of claim 1, wherein said die assembly has at least one gas delivery chamber in communication with the expansion chamber via the second series of holes.

3. The meltblown die head of claim 2, wherein the expansion chamber has a flat surface (88,90) downstream of and in alignment with the first series of holes (42,44) and the gas delivery chamber has a flat surface (92,94) downstream of and in alignment with the second series of holes (32,33) so that the heated gas passing through each series of holes impinges on the respective flat surface to provide convective heat transfer to the flat surfaces.

4. The meltblown die head of claim 2, wherein means are provided to increase the gas velocity through the gas inlet, through the first series of holes, and through the second series of holes.

5. The meltblown die head of claim 1, wherein outside surfaces of the box beam and of the die assembly are insulated.

6. The meltblown die head of claim 1, wherein the polymer feed tube is uninsulated to provide for heat transfer between the heated gas in the reservoir and the polymer in the feed tube.

7. The meltblown die head of claim 1, wherein the size of the gas inlet in relationship to the size of the reservoir is such that the initial cross velocity of the heated gas is between 100–150 feet/second and the cross velocity head is less than 0.15 psi.

8. The meltblown die head of claim 1 wherein baffles are provided at the gas inlet to the gas reservoir.

* * * * *